US010073847B2

(12) United States Patent
Adams et al.

(10) Patent No.: US 10,073,847 B2
(45) Date of Patent: Sep. 11, 2018

(54) REAL-TIME, COOPERATIVE, ADAPTIVE AND PERSISTENT SEARCH SYSTEM

(75) Inventors: Dana C. Adams, Shelburne, VT (US); Douglas Kipp Smith, Burlington, VT (US); Matthew Racine, Colchester, VT (US)

(73) Assignee: 800 RESPONSE MARKETING LLC, Burlington, VT (US)

( * ) Notice: Subject to any disclaimer, the term of this patent is extended or adjusted under 35 U.S.C. 154(b) by 506 days.

(21) Appl. No.: 13/538,408

(22) Filed: Jun. 29, 2012

(65) Prior Publication Data

US 2014/0006410 A1 Jan. 2, 2014

(51) Int. Cl.
*G06F 17/30* (2006.01)

(52) U.S. Cl.
CPC .............................. *G06F 17/30023* (2013.01)

(58) Field of Classification Search
CPC ..................... G06F 17/30424; G06F 17/30023
USPC .......................................................... 707/741
See application file for complete search history.

(56) References Cited

U.S. PATENT DOCUMENTS 4,924,496 A * 5/1990 Figa ................ H04M 1/274525 379/131
5,666,528 A * 9/1997 Thai
6,119,101 A * 9/2000 Peckover ............... G06Q 30/02 705/14.17
6,212,524 B1 * 4/2001 Weissman et al. ........... 707/600
7,421,458 B1 * 9/2008 Taylor ............... G06F 17/30607 717/170
8,428,076 B2 * 4/2013 Mansharamani ....... G06F 9/546 370/412
8,971,216 B2 * 3/2015 Beck .................. G06F 17/2765 370/260
9,305,278 B2 * 4/2016 Gross ................. G06Q 10/0633
2002/0129033 A1 * 9/2002 Hoxie et al. .................. 707/101
2004/0015470 A1 * 1/2004 Smith et al. ...................... 707/1
2004/0068489 A1 * 4/2004 Dettinger et al. ................ 707/3
2004/0103088 A1 * 5/2004 Cragun et al. .................... 707/3
2005/0015363 A1 * 1/2005 Dessloch et al. ................. 707/3
(Continued)

OTHER PUBLICATIONS

"Message Queuing (MSMQ)", Jul. 20, 2016, Microsoft, https://msdn.microsoft.com/en-us/library/ms711472(v=vs.85).aspx, extracted from the Internet Jul. 20, 2016.*

*Primary Examiner* — Apu Mofiz
*Assistant Examiner* — Sheryl Holland
(74) *Attorney, Agent, or Firm* — Greenblum & Bernstein, P.L.C.

(57) ABSTRACT

Method and apparatus for searching chronologically stored related content objects for at least one requested search definition. The method includes retrieving a search request identifying the related content objects to be searched and the at least one requested search definition to be applied to the related content objects and determining whether any new related content objects have been stored after the searching has begun. If any new related content objects have been stored, one of the new related content objects is selected for searching and, if no new related content objects have been stored, an older stored related content object is selected for searching. The method also includes applying the at least one requested search definition to the content object selected for searching, and identifying which at least one requested search definition is found in the selected content object.

17 Claims, 9 Drawing Sheets

(56) References Cited

U.S. PATENT DOCUMENTS

| | | | | |
|---|---|---|---|---|
| 2005/0050537 | A1* | 3/2005 | Thompson et al. | 717/165 |
| 2005/0063365 | A1* | 3/2005 | Mathew | G06Q 10/10 370/352 |
| 2005/0078605 | A1* | 4/2005 | Huang | H04L 29/06 370/235 |
| 2006/0198504 | A1* | 9/2006 | Shemisa et al. | 379/201.02 |
| 2006/0221941 | A1* | 10/2006 | Kishinsky | H04M 3/523 370/352 |
| 2007/0097996 | A1* | 5/2007 | Millefiorini | G06Q 10/06311 370/401 |
| 2007/0288837 | A1* | 12/2007 | Eaves et al. | 715/505 |
| 2008/0097872 | A1* | 4/2008 | Peckover | G06Q 30/02 705/26.43 |
| 2009/0097493 | A1* | 4/2009 | Patil | H04L 47/10 370/412 |
| 2009/0177301 | A1* | 7/2009 | Hayes | 700/94 |
| 2011/0185293 | A1* | 7/2011 | Barnett | H04L 67/02 715/760 |
| 2011/0194684 | A1* | 8/2011 | Ristock | H04M 3/51 379/265.02 |
| 2011/0270822 | A1* | 11/2011 | Denton | G06F 17/30442 707/719 |
| 2012/0062595 | A1* | 3/2012 | Oh et al. | 345/633 |
| 2012/0166421 | A1* | 6/2012 | Cammert | G06F 17/30474 707/718 |
| 2012/0226842 | A1* | 9/2012 | Evans | G06F 9/4818 710/264 |
| 2012/0316962 | A1* | 12/2012 | Rathod | G06F 17/30861 705/14.54 |
| 2013/0191185 | A1* | 7/2013 | Galvin | G06Q 30/01 705/7.37 |
| 2013/0198166 | A1* | 8/2013 | Prout | G06F 17/30433 707/718 |

* cited by examiner

REAL-TIME, COOPERATIVE, ADAPTIVE AND PERSISTENT SEARCH SYSTEM

BACKGROUND OF THE INVENTION

1. Field of the Invention

Embodiments of the present invention pertain to method and device for searching a stream of discrete content objects for specific content patterns. In particular, embodiments of the present invention pertain to techniques to apply new searches, and successive alterations of existing searches, to both the live stream and to the historical archive of the stream's contents.

2. Discussion of Background Information

In business, there is considerable attention directed to, e.g., improving customer service and/or monitoring employees to ensure that the company's interests are not compromised. By way of non-limiting example, Tire Store A has an 800-number and a bank of 15 telephones. The telephones may be manned by operators or may be automated to simply play a prerecorded message and then record a caller's comments/criticisms for Tire Store A. However, it is advantageous for all incoming and/or outgoing calls to be recorded. As hundreds of calls a day may be received, it is very difficult, if not impossible for an individual or group of individuals to listen to each incoming call. Thus, businesses such as Tire Store A can employ or subscribe to a service that searches recorded calls for certain terms, e.g., dissatisfied, rude, "never shopping here again," etc. so that these calls can be reviewed in detail to find and correct the problem.

There are currently several well-established technologies for processing an audio recording to analyze its spoken content, including phonetic and large vocabulary speech recognition models, by companies such as, e.g., Aurix, Nice Systems, Philips Electronics, Nuance. Similarly, existing technologies can search the contents of computer files, emails and other digital media. In each case, broadly speaking, an indexing engine of the known art converts a given content object, e.g., an audio recording, a video recording, email text, etc., into a form compatible with a specified search technology. The indexed content object can be stored in a content store, which is a virtual collection of indexed content objects that is stored in one or more memory or storage devices and that is associated with, e.g., a same user or subscriber of this technology. A separate search engine may then be tasked to search given content objects for a specified defined content, e.g., words or phrases of interest to the user or subscriber, based upon a set of search definitions. These known search engines' operations fall into two categories: those which apply a given set of search definitions to a fixed content store; and those which apply a given set of search definitions to newly received additions to a content store.

The former category is usually associated with large stores, e.g., thousands of content objects, which can require a significant amount of processing power. Thus, such searches are often run via a batch process. The processing strategy here is very simple: every search definition is applied to every member of the content store, e.g., each search definition is successively applied to all content objects in the object store or all search definitions are successively applied to each content object in the object store.

The latter category, since it searches only the newly arrived content stores, is much less processor-intensive, i.e., upon receipt of a new content object to the content store, the search definitions are applied to the new content object. However, in the event the user or subscriber want to perform new searches and/or make changes to existing searches, e.g., adding or removing terms or phrases, the new/changed searches will only be applied to those content objects received after the time that the new/changed searches are made effective, i.e., the new/changed searches will not be applied to the previously search content objects. The processing strategy here is more complex, typically requiring a software agent to decide which search definitions, if any, to evaluate for a given newly arrived content object. Software agents like this, which mediate the interaction between a computer system's data stores and its user interactions, are commonly referred to as "middleware".

In order to apply new searches, and successive alterations of existing searches, to both the live stream and to the historical archive of the stream's contents, a significant modification of the software middleware would be required: in addition to deciding which search definitions to evaluate for a given newly arrived content object, it may also be necessary to decide which content objects to evaluate for a newly activated search definition. Further, since the latter activity could generate very large processing loads, i.e., searching large numbers of content objects, this new middleware must also be able to equitably allocate processing resources across search requests.

SUMMARY OF THE EMBODIMENTS

According to embodiments of the invention, a search may include one or more search definitions, which can be understood to be a group of separate content fragments, or a group of such groups, joined by a specific logical calculus for one or more specified content stores. A content object can be understood to be in the domain of a given search if the content object is associated with the search; and a particular content object may be in the range of a given search if the logical calculus of the search definition evaluates to "true" for that content object.

Accordingly, embodiments of the present invention provide a method in which a new content object can be added to a content store, and all search definitions whose domains include that content object are subsequently identified, presented to and processed by a generic search engine and processed in near-real-time.

In a further aspect of the embodiments, whenever a new search definition is created, the method can include automatically making a series of requests to a generic search engine to apply all content fragments within the search definition against all content objects in the domain of that search definition.

Other aspects of the embodiments are directed to a method that includes, whenever a search definition is changed, a series of requests will automatically be made to a generic search engine to apply only those content fragments of the search definition which were actually changed, against all content objects in the domain of the search definition.

In still another aspect of the embodiments of the present invention, a method can include, whenever a given search definition which has been deactivated and later reactivated, a series of requests will automatically be made to a generic search engine to apply content fragments of the search definition against only those content objects in the domain of the search definition that were placed in the content store after the search definition was deactivated.

Another aspect of the embodiments allows users to dynamically remove content fragments, add content fragments, and/or change content fragments within search definitions, without placing an on-going processing of the original definition on hold. In this way, such edits can easily be discarded, or used to create a brand-new search definition, while assuring the integrity associated with the original definition, and avoiding unnecessary reprocessing.

Moreover, aspects of the embodiments provide a method that processes concurrent search requests in a sequence, whereby no single request unduly delays the processing of all other searches.

Embodiments of the instant invention are directed to a method for searching chronologically stored related content objects for at least one requested search definition. The method includes retrieving a search request identifying the related content objects to be searched and the at least one requested search definition to be applied to the related content objects, and determining whether any new related content objects have been stored after the searching has begun. If new related content objects have been stored, one of the new related content objects is selected for searching and, if no new related content objects have been stored, an older stored related message is selected for searching. The method also includes applying the at least one requested search definition to the content object selected for searching, and identifying the at least one requested search definition that pertains to the selected content object.

According to embodiments, the chronologically stored related content objects may include at least one of processed digital recordings and records. Further, the processed digital recordings and records comprise at least one of processed voice recordings; processed video recordings; and emails.

In accordance with other embodiments, the method may further include determining that the at least one requested search definition has been changed. The at least one search definition can include at least one content fragment, and the method may further include determining whether the change includes at least one deleted content fragment. Further, the method can include determining whether the change includes at least one additional content fragment to be searched, and applying the changed at least requested one search definition to a next selected content object of the related content objects.

According to still other embodiments, the method may include determining whether a previously inactivated at least one requested search definition is being reactivated.

In accordance with other embodiments of the invention, the method may include formatting the search result through a user interface.

Embodiments of the invention are directed to an apparatus for searching chronologically stored related content objects for at least one requested search definition. The apparatus includes a search queue structured and arranged to identify the related content objects to be searched and the at least one requested search definition to be applied to the related content objects, and a search loader structured and arranged to determine whether new related content objects have been stored after the searching has begun. If new related content objects have been stored, one of the new related content objects is selected for searching and, if no new related content object have been stored, an older stored content object message is selected for searching. The apparatus also includes a search service structured and arranged to apply the at least one requested search definition to the content object selected for searching, and a search result store structured and arranged to identify which of the at least one search definition is found in the selected content object.

According to embodiments of present invention, the search loader can be further structured to determine whether the at least one requested search definition has been changed. The at least one requested search definition can include at least one content fragment, and the search loader can be further structured and arranged to determine whether the change includes at least one deleted content fragment. The search loader can also be structured and arranged to determine whether the change includes at least one additional content fragment to be searched, and the search service may be further structured and arranged to apply the changed at least one search definition to a next selected content object of the related content objects.

In accordance with still other embodiments, the search loader can be further structured and arranged to determine whether a previously inactivated at least one search definition is being reactivated.

According to other embodiments, a user interface may be structured and arranged to format the search results.

In accordance with still other embodiments of the invention, a user interface may be structured and arranged to receive user input to at least one of change at least one requested search definition and reactivate a previously deactivated at least one requested search definition.

Embodiments of the invention are directed to a method for searching a plurality of content objects for defined content fragments. The method includes scanning for an active search request, finding a least recently updated search request record comprising at least one content object reference, identifying a newest content object reference to be searched, retrieving content fragments that form at least one search definition associated with the content object record to be searched, and searching for each of the at least one definitions in the content object reference to be searched. The method also includes recording which of the possibly one or more search definitions are found in the searched content object record, discarding the searched content object reference, determining whether any additional content object references remain, and repeating the scanning, finding, identifying, retrieving, searching, recording, discarding and determining until an active search request is not found.

Embodiments of the present invention are directed to a method of searching content objects. The method includes receiving a message associated with a user, indexing the message to form a new content object and storing the new content object with related content objects associated with the user, and determining whether a search of the related content objects is active. If a search is active, the method further includes selecting the new content object for searching, retrieving a search request comprising at least one requested search definition, applying the at least one requested search definition to the new content object, and identifying each at least one search definition found in the new content object.

In accordance with still yet other embodiments of the present invention, the message can include comprises at least one of digital voice recordings; digital video recordings; and emails.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
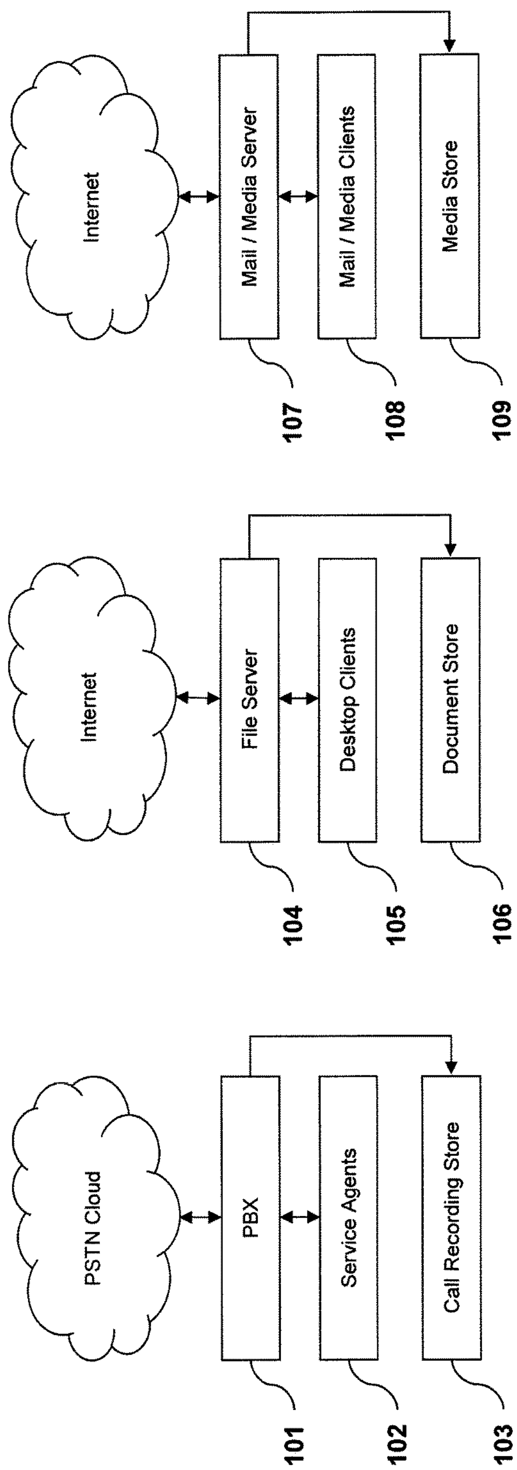
FIG. 1 is a schematic diagram showing three examples of the discrete content object environment to which this invention pertains: a) a telecommunications switch that routes calls between the public switched telephone network and service agents handsets b) a computer hardware host which provides local and remote file access services to a document store, and 3) a computer hardware host which provides email/media access services.

FIG. 1 illustrates three non-limiting examples of telecommunications and computer hardware and services that give rise to the discrete content object environments to which embodiments of the invention pertain: a) a telecommunications switch 101 that fields calls from the public switched telephone network PSTN and routes such calls to service agents 102 and a call recording storage device 103 that records all such conversations; b) a computer hardware host 104, e.g., a file server, which can be connected wireless or wired access the Internet through one or more public and/or private networks, is structured and arranged to provide local and remote file access services to desktop computers 105, and to store such accessed files in document store 106; 3) a computer hardware host 107, e.g., a mail/media server, which can be connected to access the Internet through one or more public and/or private networks, is structured and arranged to provide email/media access services to email/media clients 108 and to store such email and media sent to and received by email/media client 108 in an email/media storage device 109. Call recording store 103, document store 106 and/or media store 109 may be local, remote or a combination thereof from the client/agents and/or the switch/servers, e.g., the stores can be provided on a remote server or in the "cloud."

Figure 2:
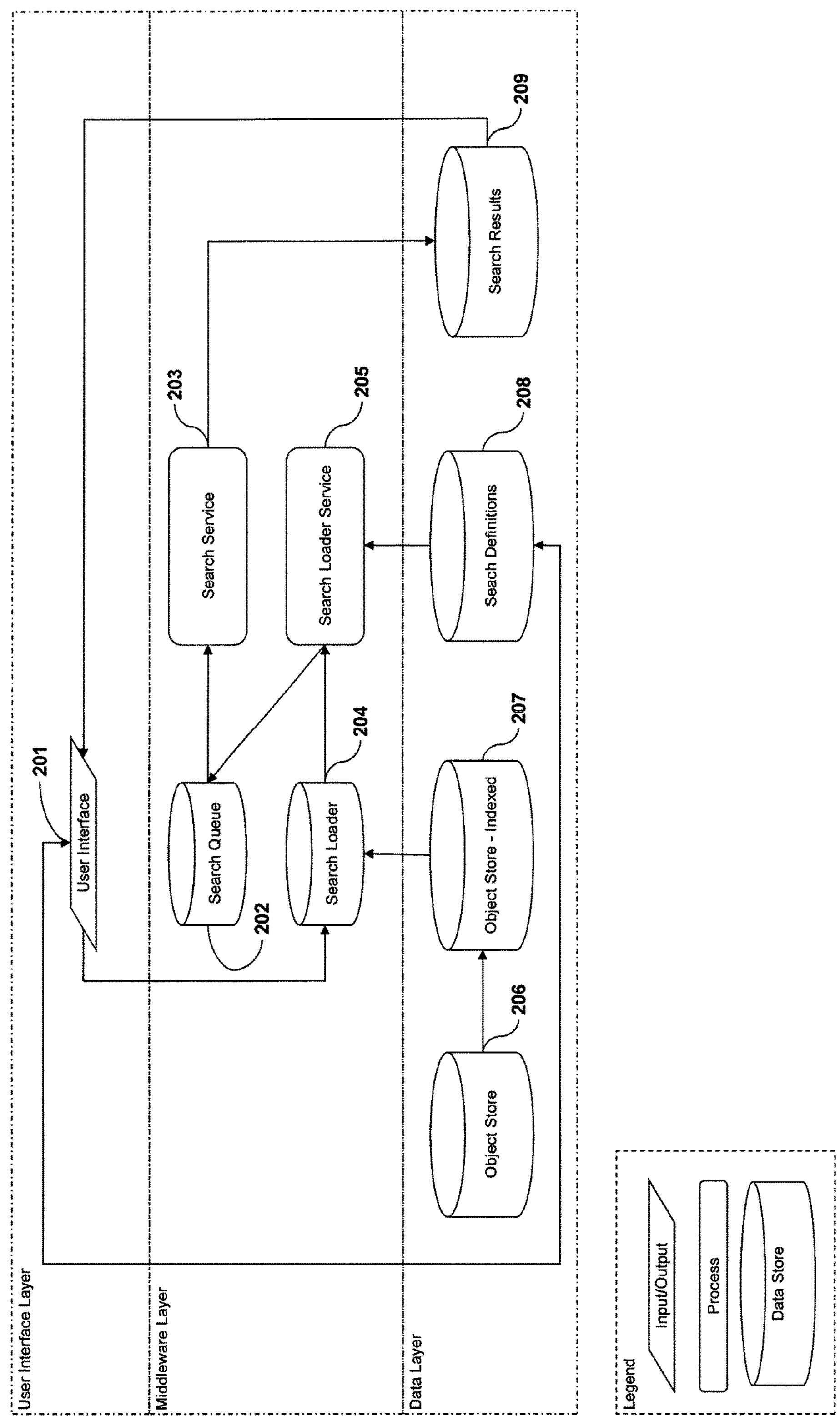
FIG. 2 is a schematic diagram showing the system components and procedure flow of the middleware inventions by which events occurring in the data layer and the user interface layer are mediated by the search loader service, to generate and place the appropriate search requests in the search queue.

A search system whose nominal operations span both a live stream of discrete content objects and the stream's historical archives must allocate its host computer's processing power equitably between evaluating each new content object against the appropriate search definitions and evaluating all content objects for new, changed, and reactivated searches. FIG. 2 is a schematic diagram showing the system components and general procedure flow of the middleware for mediating events occurring in a data layer and a user interface in order to generate and place appropriate search requests in a search queue via a search loader service. The search system can include a middleware layer arranged between a data layer and a user interface layer. Object store 206 can be a computer readable or computer accessible tangible storage device, including, but not limited to, electronic, magnetic, optical, electromagnetic, semiconductor or solid state systems (or apparatus or device), and may include, e.g., semiconductor or solid state memory, magnetic tape, removable computer diskette, random access memory (RAM), read only memory (ROM), a rigid magnetic disk, flash drive, or an optical disk, such as a read only compact disk (CD-ROM), read/write compact disk (CD-R/W). Object store 206 can be provided to store the object content in its original form, e.g., open or proprietary streaming video recording format (e.g., Windows Media, Real Media, Quicktime, MPEG-4, Flash or other suitable format), open or proprietary audio recording format (e.g., MP3; way; aiff; vox, wma, aac, atrac, ra, dss, msv, dvf or other suitable format), open or proprietary text format (e.g., ASCII, Microsoft Word, .gdoc, .rtf, .wpd, wps or other suitable format). It is noted that the file formats for the object content should correspond to the selected technology for processing the recordings or text.

While not discussed in further detail, it should be understood by the ordinarily skilled artisan that the above-discussed technologies for processing the object content can process streaming signals and store the original content in object store 206 and can store the processed signal, which may have been converted to another format/structure compatible with the underlying search technology, in indexed object store 207. Depending on the nature of the process that streams new information into the indexed content object store 207, the arrival of new converted content objects can be detected in a number of ways apparent to the ordinarily skilled artisan. Search loader queue 204, which is coupled to indexed content store 207 and user interface 201, acts as an intermediary to inform the user interface layer of events occurring in the data layer, e.g., new converted content objects in the indexed content store 207, and events occurring in the user interface layer, e.g., new search request input to search loader 204 via user interface 201 by a user or subscriber or new search definitions being entered into search definitions store 208 via user interface 201 by the user or subscriber. The user interface can be in a program stored on the user's or subscriber's computer remote from and connected to the middleware layer and the data layer through wired or wireless access via the Internet and/or through one or more public or private networks. Alternatively, the user interface can be in a program stored on a remote server accessible by the user's or subscriber's computer through wired or wireless access via the Internet and/or through one or more public or private networks. By way of example, search loader queue 204 can be polled or examined on a regular basis by search loader service 205 in order to identify to the events occurring in the data layer and/or user interface layer. Search loader service 205, is coupled to search loader 204 to derive and populate a search in search queue 202 with the appropriate search data and to notify search queue 202 of any additions/revisions to the search definitions in search definitions store 208, which store the definitions for the currently active search. Search service 203 is responsible for efficiently processing the records in search queue 202, determining the search's content object range and updating the search results table 209.

Figure 3:
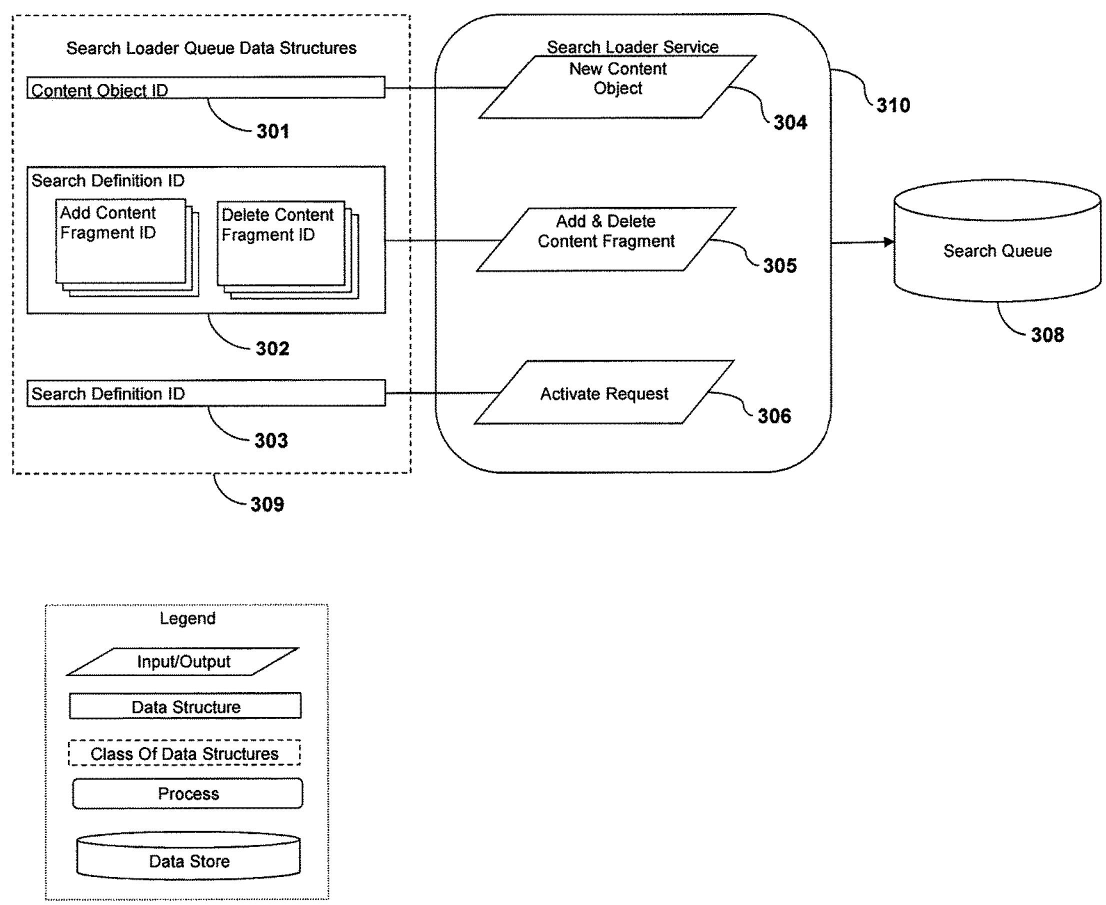
FIG. 3 is a schematic diagram showing the internal structure of the search loader queue.

Referring to FIG. 3, search loader service 310 handles three distinct types of requests: requests to evaluate a newly arrived content object 304; requests to add or delete a content fragment in a search definition 305; and requests to activate/reactivate a search definition 306. Accordingly, the information placed in the search loader queue 309 varies depending on the nature of the request.

For newly arrived content objects 304, only new content object identifier 301 is specified. When adding or deleting a content fragment in a search definition 305, search definition identifier 302 includes content fragment identifiers to add, if applicable, and/or content fragment identifiers to delete, if applicable. When activating/reactivating a search definition 306, only search definition identifier 303 is specified.

Search loader queue 309 is continually examined or polled by the search loader service 310 so that, when any entry is detected in search loader queue 309, service loader service 310 uses this new information to build the appropriate entries in search queue 308.

Figure 4:
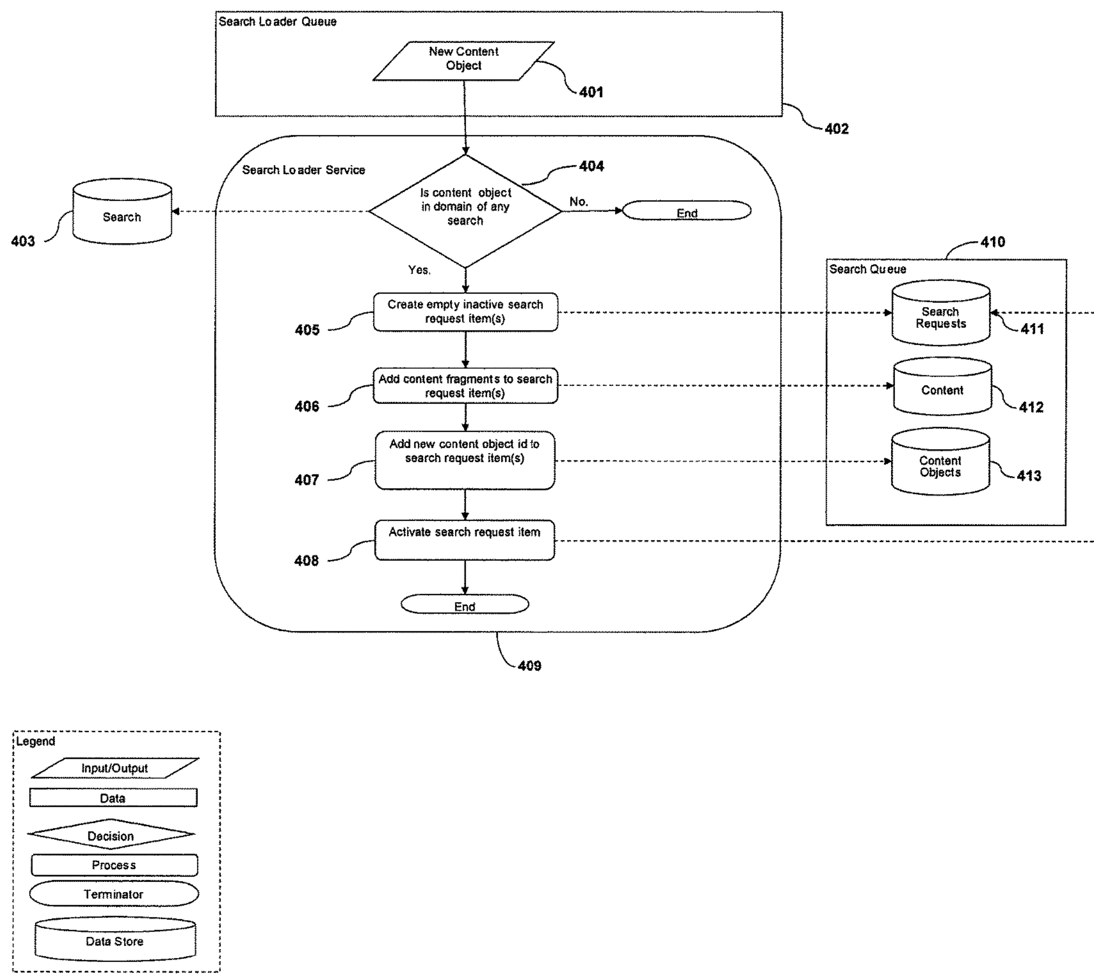
FIG. 4 is a procedural flowchart showing the technique used by the search loader service to process the search loader queue and load the appropriate entries to the search queue for newly arrived content objects.
Figure 5:
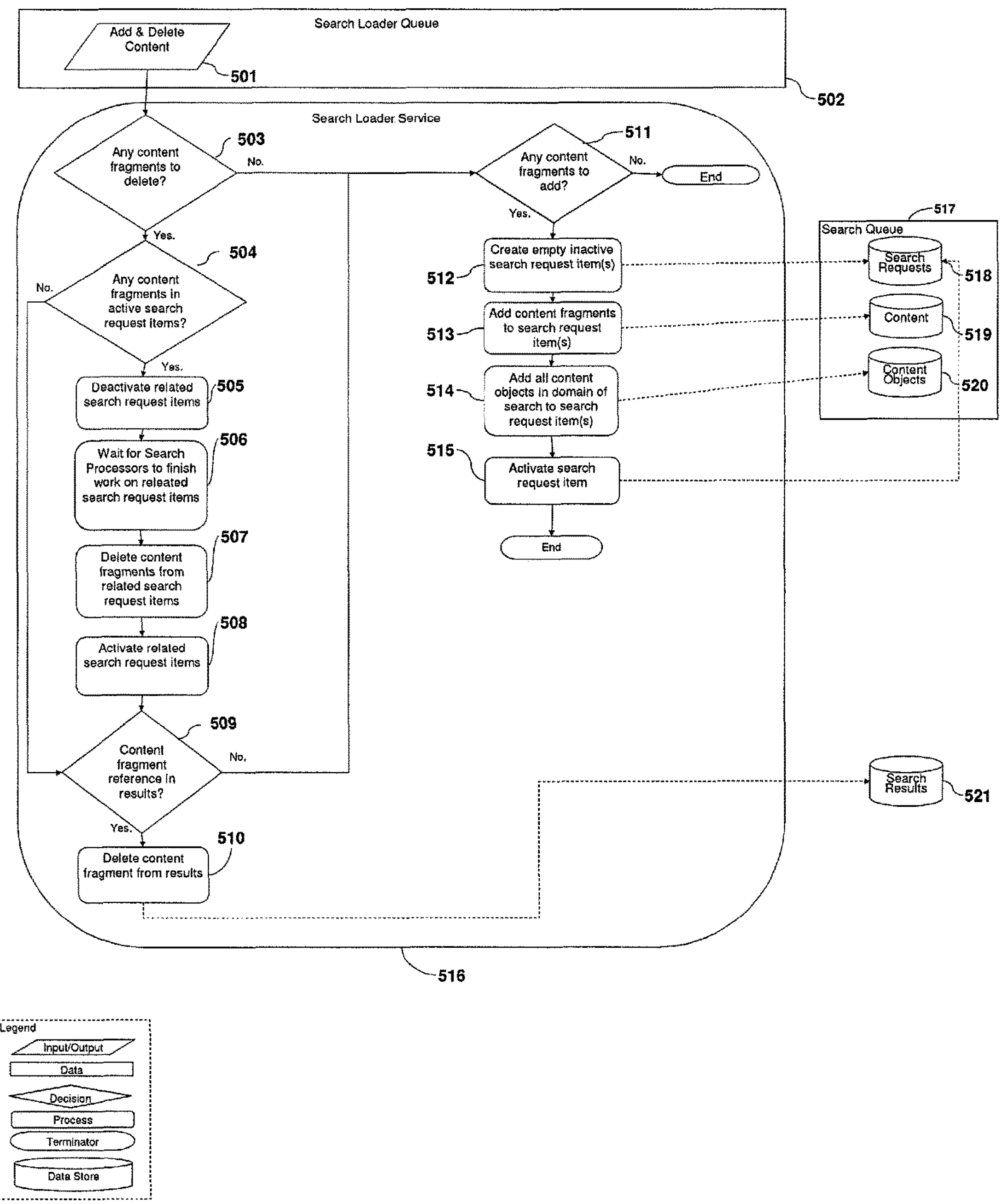
FIG. 5 is a procedural flowchart showing the technique used by the search loader service to process the search loader queue and load the appropriate entries to the search queue when one or more content fragments have been added to or deleted from a search definition.
Figure 6:
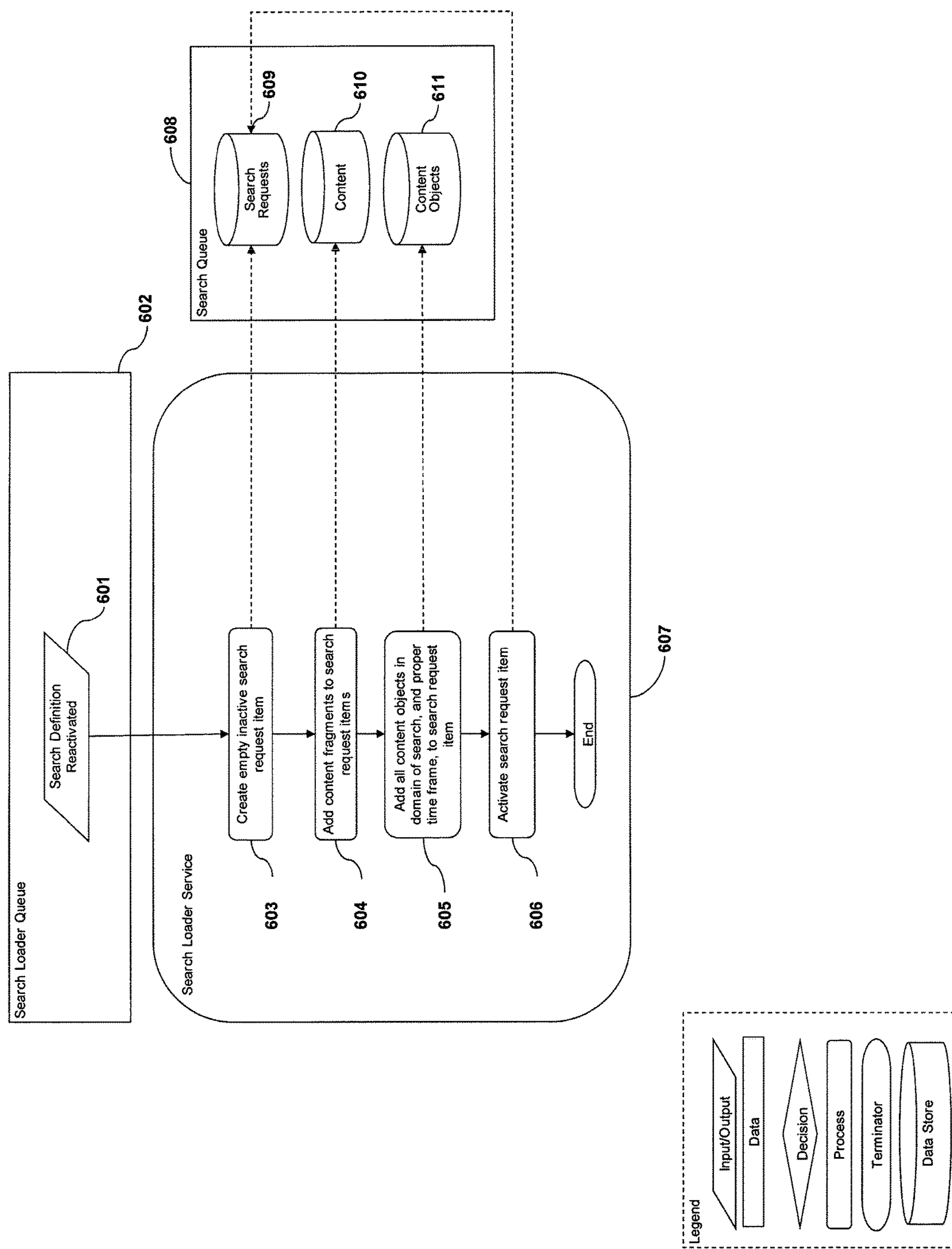
FIG. 6 is a procedural flowchart showing the technique used by the search loader service to process the search loader queue and load the appropriate entries to the search queue when a search definition has been reactivated.

FIG. 4 diagrammatically illustrates a search process for a new content object. Search queue 410 is comprised of three separate data structures: a search request data store 411 to identify the particular search, a content fragment data store 412 to specify the collection of content fragments associated with that search, and a content object data store 413 to specify the collection of content objects in the domain of a search request.

To build search queue entries to handle newly discovered or arrived content objects 401, search loader service 409 examines search loader queue 402 for new content object entries. When a new entry of this type is found, search loader service 409 first gathers all search definitions in search definitions store 403 whose domains include the new content object 404. At 405, search loader service 409 then creates an empty item in search request data store 411 of search queue 410, and marks it as "inactive". At 406, search loader service 409 then places all content fragments associated with the new search definition into content fragment data store 412, and then, at 407, places the single content object id number into content object data store 413. At 408, the search request item is marked as "active", allowing the now completely defined search to be processed by the search service.

To build search queue entries to handle changes, e.g., additions, revisions, deletions, to search definitions identified in 501, the changed search definition is initially saved with its newly added and/or newly deleted content fragments marked as such, typically by a user interface. This interaction places the search definition number in search loader queue 502. Search loader service 516 examines search loader queue 502 for new entries. When a new entry of this type is found in search loader queue 502, search loader service 516 first determines at 503 if the specified revised search definition contains any deleted content fragments. If it does, at 504, search loader service 516 scans for currently active search requests in search request store 518 of search queue 517 containing the now deleted content fragments, and deactivates any such searches at 505. At 506, after allowing any search processors currently working on the requests to complete their work so as to preserve data integrity, the content fragments are deleted at 507 from content fragment data store 519 and the search queue items are reactivated at 508. Finally, at 509, if the deleted content fragments are found in the search results store 521, they are removed from that store at 510. Search loader service 516 next determines at 511 if the specified revised search definition contains any added content fragments. If it does, at 512, search loader service 516 creates an empty item in search request data store 518 and marks it as "inactive". At 513, search loader service 516 can place the new content fragments associated with the given added search definition into the content fragment data store 519. At 514, the collection of identifiers for the content objects in the domain of the search definition is then inserted in content object data store 520. At 515, the search request item is activated, allowing the now completely defined search to be processed by the search service.

When a search definition, after having been deactivated earlier, is reactivated at 601, the search loader service 607 can create an empty item at 603 in search request data store 609 of search queue 608 and marks the item as "inactive". Then, at 604, search loader service 607 can place all content fragments associated with the given reactivated search definition into content fragment data store 610. Then, at 605, the collection of identifiers for the content objects in the domain of the search definition, whose arrival dates fall within the span of time during which the search definition was deactivated, is inserted in content object data store 611. Finally, the search request item is activated at 606 to allow the now completely defined search to be processed by the search service.

Figure 7:
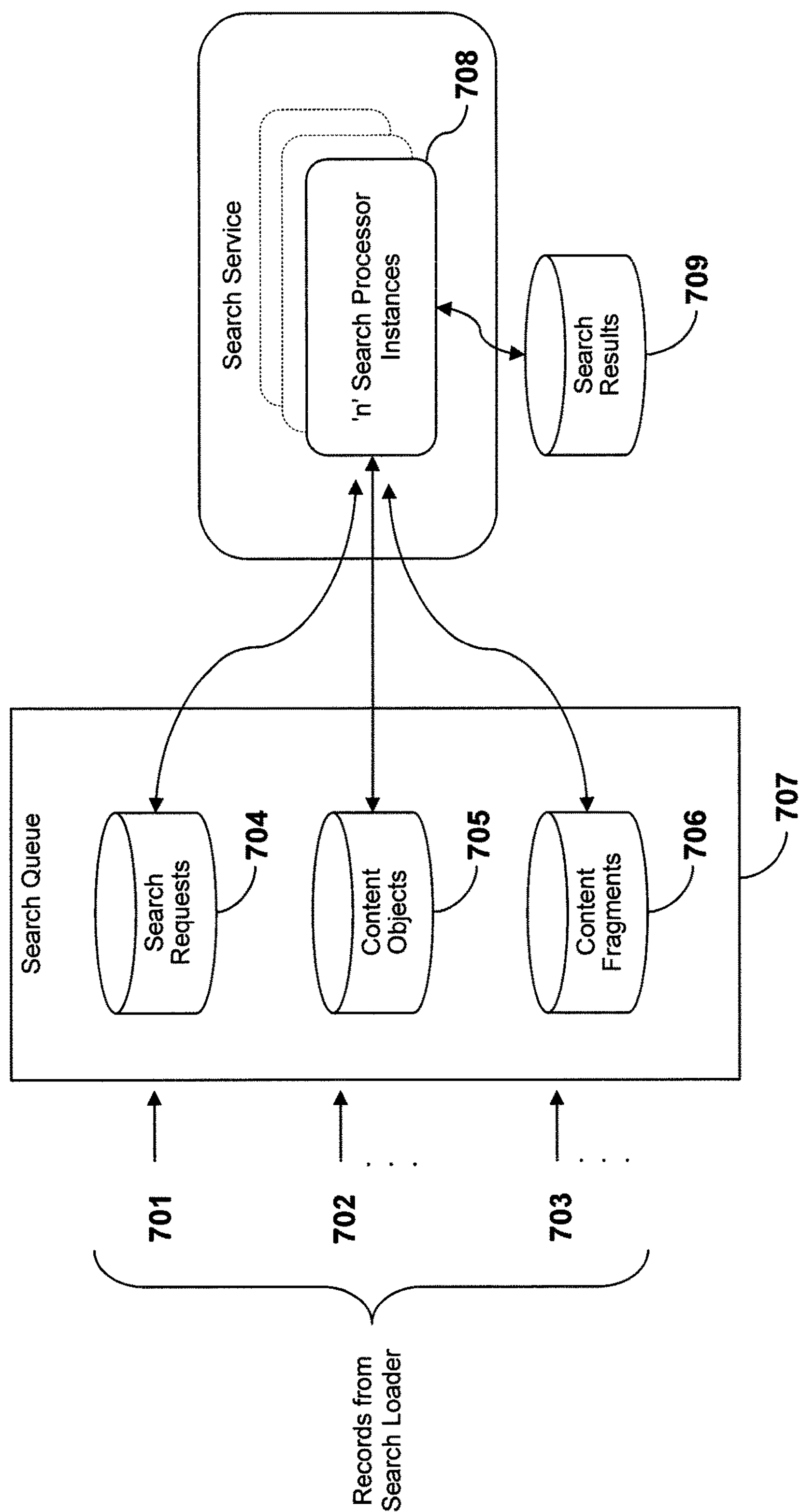
FIG. 7 is a schematic diagram showing the search process and search queue relationships.

As shown in FIG. 7, a search request from the search loader service may be defined and completely specified as a combined collection of a single request record 701, one or more references to content objects 702 to be searched and one or more references to content fragments 703, i.e., the subjects of the search.

The search loader service described above is responsible for placing the pertinent information into search queue stores 704, 705, & 706, which, taken altogether, form search queue 707. At any given time, search queue stores (704, 705, 706) may contain any number of independently generated search requests associated with any number of search definitions. The search queue stores (704, 705, 706) and the search results store (709) can be operated on by multiple, independent search processors (708).

Figure 8:
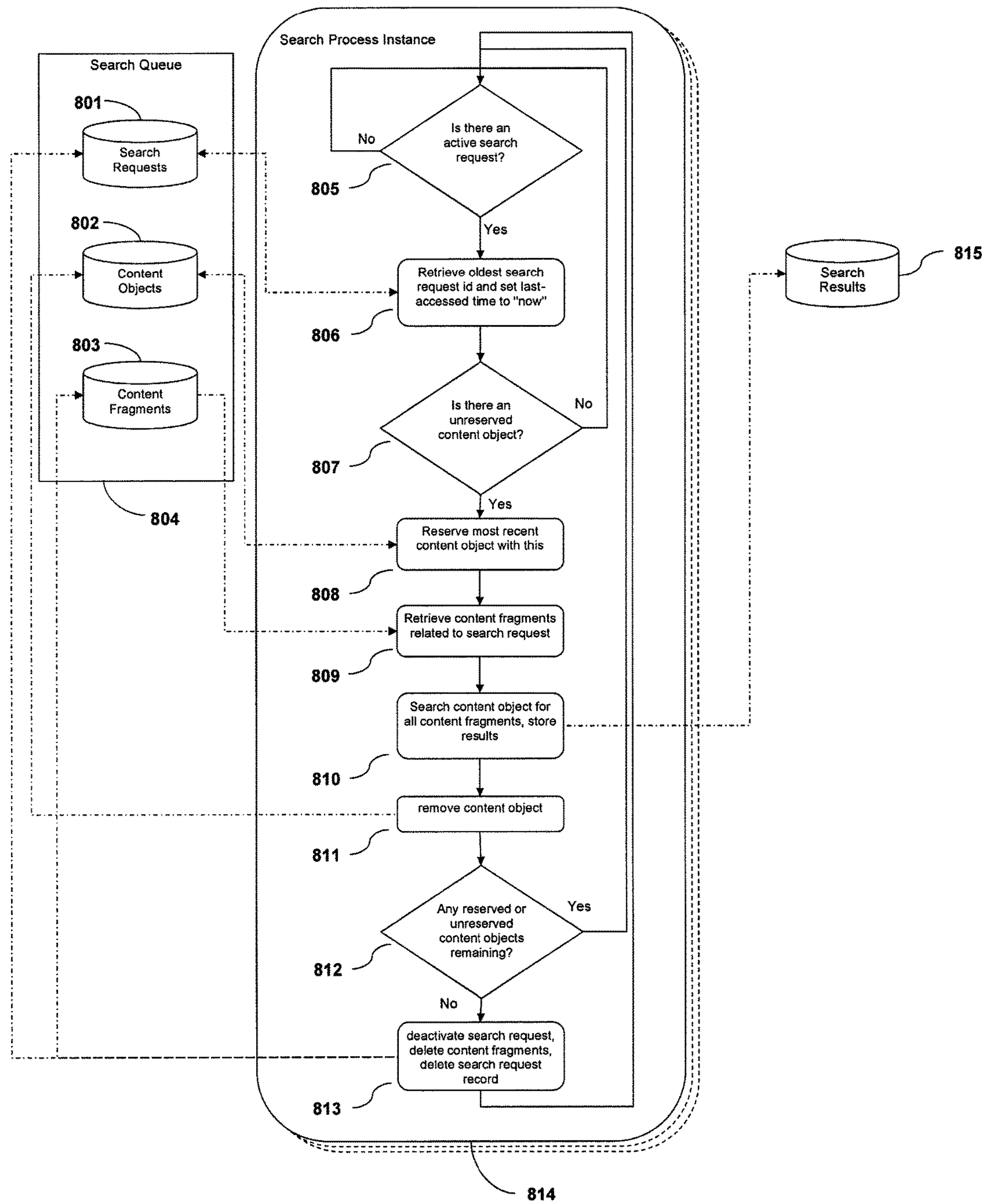
FIG. 8 is a procedural flowchart showing the technique used by the search service to process the search queue and load the results of each search to the search results store.

As diagrammatically illustrated in FIG. 8, a search cycle begins at 805 with a search processor instance 814 scanning search request data store 801 of search queue 804 for an active search request. If an active request is found, search processor instance 814 selects, at 806, the search request record least recently updated by another search processor, and updates its access date and time to the present moment. Search request records are cyclically accessed in this manner to ensure an equitable distribution of processing resources across the population of search requests by preventing a single deep search (i.e., a search with a very large number of objects) from getting a disproportionate amount of processing resources at the expense of other search requests.

Search request records remain within search request data store 801 as long as there are records in content object data store 802 to examine. After a given search processor determines whether there is an active search at 805 and updates the oldest search record at 806, the processor at 807 may determine whether there is an unrestricted content object. If an unrestricted content object is found, the process can select and reserve at 808 for its exclusive use the newest unreserved content object record in the content object data store 802 that is in the domain of the current search request. Reserving the content object record prevents any other processor instance from attempting to process this particular search request/content object reference pairing.

Once the content object reference has been reserved at 808, the search processor instance at 809 retrieves all of the associated content fragments from content fragment data store 803. The processor instance may then search the content for all occurrences of each and every associated content fragment, and then saves at 810 the results of each search into a results data store 815, keyed with the search definition id, content object id, and content fragment id, along with identifying whether and where each fragment was found within the content object. After each and every content fragment has been processed, the content object record at 811 is discarded from the data store 802.

The search processor instance then checks at 812 to see if any content object records (either reserved or unreserved) remain. If so, the entire process beginning with the search request record examination can start over at 805. If not, at 813 this particular search can be deactivated in search request store 801, then the associated content fragments can be discarded from store 803, and finally the search request record itself can be discarded.

When this happens, in order to continue to derive and post search results in near-real-time for all active search definitions, the data structures and logic described herein will ensure that any given search processor instance will continually apply its efforts to a combination of the least-processed search request and the most recently arrived content object. That is, instead of simply processing a given search request (and all its attendant content objects), the invention processes successive pairings of the oldest active search request and the newest content object, maximizing the "breadth" of its operations.

In this way, all active search requests are given equal weight, regardless of the number of content objects in their domain—no single search request can monopolize the operation of the search engine, even those "deep" searches with very large numbers of content objects.

Although some searches definitions may contain more content fragments than others, the variation in the number of content fragments may be orders of magnitude less than the number of content objects in the domain of the search requests associated with those definitions. Thus, in addition to choosing the most recent content objects, it is important to note that, at the conclusion of each search cycle, a processor instance has evaluated all content fragments associated with its current search, and a decision with real business value has been made: is the given content object in the range of a given search? The embodiments of the invention thus balance the need to perform historical analyses against the need to deliver timely results.

Figure 9:
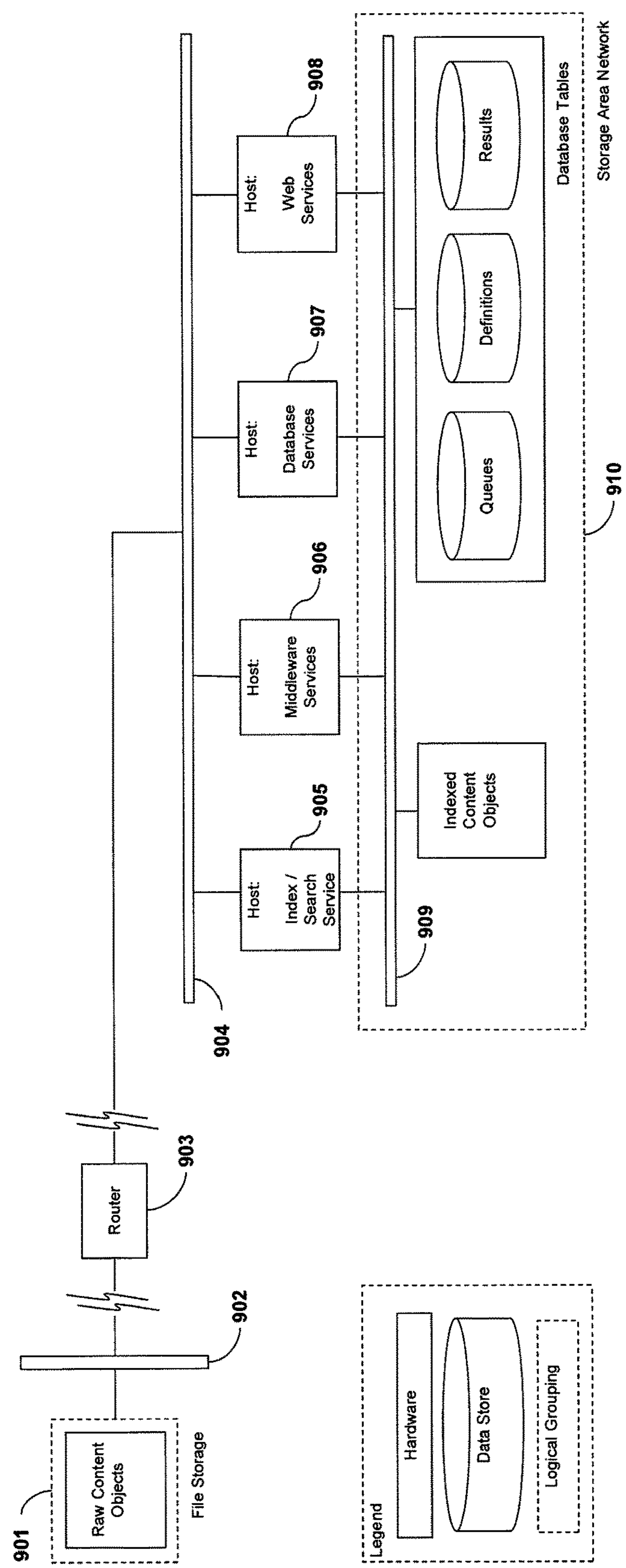
FIG. 9 shows a computer and network hardware platform which could host a representative instance of the invention.

FIG. 9 shows an exemplary and non-limiting embodiment of a computer and network hardware platform that could host a representative instance of the invention. Raw content objects may be stored on a mass file storage device 901 which supports network file system access via a data network backbone 902. If all the assets in FIG. 9 are not in the same physical location, then network 902 may be interconnected to a second network 904 via a wide area network connection and router 903. Networks 902 and 904 would typically operate under either the 100BASET or 1000BASET Ethernet broadband network.

Computer hosts 905, 906, 907, and 908 would be interconnected via network 904. Typically, no monitor or keyboard would be attached to any of these hosts; instead, system administrators would interact with host hardware via network 904 using direct remote access control technologies, and would use a secure shell or remote desktop technology to interact with the services running on each such host.

Computer hosts 905, 906, 907, and 908 would also be connected to a separate high capacity and high performance disk array 910 via storage area network backbone 909, which provides network file-level storage to the hosts: the indexed content objects would be written and read here, and all database operations would be served here as well. The search service in accordance with embodiments can run on host 905; its search loader service can run on host 906; the queues driving both of these services may reside on disk array 910, in the tables of the database engine that underlies the database server on host 907; and the web interface used to build and maintain search definitions, and review search results can run on host 908.

In accordance with an exemplary embodiment of the invention, the search method and device persistently apply search criteria to newly arrived recordings in real-time while cooperatively working backward in time through existing recordings until all have been searched, by describing how it would act to resolve the contents of an evolving Search Queue. In the following example, the Search Service is comprised of four Search Processor Instances:

TimeMark 0: Queue is empty

TimeMark 1:00

User saves/activates a new Search S1 with 20 target phrases, and with 500 recordings in its domain as of the TimeMark;

Search Loader Service places the Search Request ID, the Target Phrase IDs (Content Fragments), and the 500 recording IDs (Content Objects) into their respective queues; and Each Instance picks up the most current unprocessed Search Request, and that Request's most current unsearched recording, and searches it for all 20 phrases; all four Search Instances will continue to work on this Search Request in this fashion until another Search Request is queued.

TimeMark 1:02

A phone call ends, and a brand new recording is saved and indexed; the recording is in the domains of two separate Searches S2 & S3;

Search Loader places S2 & S3's Search Request IDs, their Phrase IDs and the single recording ID into the respective Search queues, which still contains the bulk of the entries from TimeMark 1:00; and The next two of the four Search Processor Instances to finish a task will detect a newly arrived search, and will then search that one recording for all its respective target phrases and will then resume processing on S1.

TimeMark 1:03

User saves/activates an edited search S4 with 20 target phrases, five of which are new phrases, and with 1000 recordings in its domain;

Search Loader Service places the Search Request ID, the five newly added Target Phrase IDs, and the 1000 recording IDs into their respective Search Queues; and Search Processor Instances divide their time between searches S1 and S4, working backward in time through the recordings, and distributing their attention across Search Requests according to the length of the recordings and the number of target phrases in each Request's Search Definition.

TimeMark 1:04

Another phone call ends, and a brand new recording is saved and indexed; the recording is in the domain of Search S4;

Search Loader places the Search Request ID, all 20 Phrase IDs and the single recording ID into the respective Search queues, which now contain the bulk of TimeMark 1:00's and 1:03's entries; and The next Search Processor Instance to finish a task will detect a newly arrived search, will then search that one recording for all 20 target phrases and will then resume processing on S1 and S4.

Accordingly, embodiments of the invention give priority to new recordings and work cooperatively to perform the balance of the search requests on the older recordings. The embodiments achieve this by adapting to the changing environment reflected in the Search Queue as new recordings are delivered and new searches are saved and activated.

According to further embodiments of the invention, a number of search terms can be joined with Boolean operators. By way of non-limiting examples, assume the user wishes to search content objects representative of recorded telephone calls for search terms A AND B, where A and B represent distinct search terms each including one or more content fragments. However, if the user later decides to change the search to A OR B by revising the search at the user interface, this change would not be treated as a revised search in the manner discussed above. This is because the Boolean operators are used for formatting the search results, not to define the search. In other words, regardless of the Boolean operator, the method and apparatus according to the embodiments searches the content object under investigation for each requested search term, and when a term is found, the result is record. Thus, under the above non-limiting example, the content object is searched for A and B and the search results are provided. The Boolean operators are used to format the results, i.e., A AND B or A OR B, not to change the search parameters.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for chronologically searching related digital documents/media for at least one requested search definition, comprising:

storing received digital documents/media in an object store, the digital documents/media comprising at least one of processed voice recordings, processed video recordings, processed audio recordings and emails;

retrieving at least one search request identifying the digital documents/media to be searched and the at least one requested search definition to be searched in the related digital documents/media;

placing at least the digital documents/media related to the at least one search request, which are stored in the at least one object store, into a search loader queue and placing digital documents/media newly saved in the object store into the search loader queue;

populating a first search queue for the at least one search request with the related digital documents/media related to a domain of the at least one search request from the search loader queue at a marked time;

chronologically searching with at least one search processor the related digital documents/media in the first search queue for the at least one search request for the at least one requested search definition, wherein the related digital documents/media in the first search queue are chronologically searched from the related digital documents/media most recently stored in the object store to oldest related digital documents/media stored in the object store;

continually polling the search loader queue for newly received digital documents/media placed in the search loader queue after the marked time;

wherein, when the continual polling finds newly received digital documents/media, further comprising:

determining whether the newly received digital documents/media is within a domain of the at least one search request, and when the newly received related digital documents/media is within the domain of the at least one search request, the at least one search processor will next search the newly received digital documents/media for the at least one requested search definition, and thereafter, resume the chronological searching the digital documents/media in the first search queue for the at least one search request for the at least one requested search definition; and identifying which of the stored related digital documents/media and the newly received related digital documents/media searched contain the at least one requested search definition.

2. The method according to claim 1, further comprising continually polling the search loader queue for a modified at least one requested search definition.

3. The method according to claim 1, wherein, when the continual polling of the search loader queue finds a modified at least one search definition and the at least one requested search definition comprises at least one content fragment, and the method further comprises determining whether the modified at least one search definition includes at least one deleted content fragment.

4. The method according to claim 3, further comprising determining whether the modified at least one search definition includes at least one additional content fragment to be searched; and searching with the at least one search processor a next selected digital document/media of the related digital documents/media for a changed at least one requested search definition.

5. The method according to claim 1, further comprising continually polling the search loader queue for an activation of a previously deactivated at least one requested search definition, wherein, when the continual polling of the search loader queue finds the activation of a previous deactivated at least one search definition, the method further comprises searching with the at least one search processor a next digital documents/media of the related digital documents/media with the activated at least one requested search definition.

6. The method according to claim 1, further comprising formatting the search result through a user interface.

7. The method according to claim 1, wherein, when the continual polling finds newly received digital documents/media, the method further comprises:

determining whether the newly received digital documents/media is within a domain of a separate search request in a separate search queue, and when the newly received related digital documents/media is within the domain of a separate search request in a separate search queue, the at least one processor will next search the newly received digital documents/media for at least one search definition in the separate search request, and then resume the chronological searching the digital documents/media in the first search queue for the at least one search request for the at least one requested search definition.

8. A computer apparatus for chronologically searching related digital documents/media for at least one requested search definition, comprising:

a memory that stores the related digital documents/media, including the related digital documents/media and instructions, the digital documents/media comprising at least one of processed voice recordings, processed video recordings, processed audio recordings and emails; and a processor that executes the instructions, wherein the executed instructions define:

a search loader queue in which at least the digital documents/media related to the at least one search request, which are stored in an object store, and digital documents/media newly saved in the object store are placed;

a search queue in which the related digital documents/media to be searched, which are related to a domain of the at least one search request, and the at least one requested search definition to be searched in the related digital documents/media are populated at a marked time;

a search service in which at least one search processor chronologically searches the related digital documents/media in the search queue for the at least one requested search definition, wherein the related digital documents/media are chronologically searched from the related digital documents/media most recently stored in the object store to oldest related digital documents/media stored in the object store, wherein the search loader queue is continually polled by a search loader service for newly received digital documents/media placed in the search loader queue after the marked time, and the search loader service is configured to populate the search queue with the newly received related digital documents/media;

wherein, when the continual polling finds newly received digital documents/media in the search loader queue, the processor is executable to determine whether the newly received digital documents/media is within a domain of the at least one search request, and wherein, when the newly received related digital documents/media is within the domain of the at least one search request, the at least one search processor will next search the newly received digital documents/media for the at least one requested search definition, and thereafter, resume the chronological searching the digital documents/media in the search queue for the at least one search request for the at least one requested search definition; and a search result that identifies which of the stored related digital documents/media and the newly received related digital documents/media contain the at least one requested search definition.

9. The apparatus according to claim 8, wherein the chronologically stored related digital documents/media comprise at least one of processed digital recordings and records.

10. The apparatus according to claim 9, wherein the processed digital recordings and records comprise at least one of processed voice recordings, processed video recordings and emails.

11. The apparatus according to claim 8, wherein the search loader queue is continually polled by the search loader service to determine whether the at least one requested search definition has been modified, and the search loader service is configured to populate the search queue with the modified at least one requested search definition related-digital documents/media.

12. The apparatus according to claim 8, wherein, when the continual polling of the search loader queue finds a modified at least one requested search definition and the at least one requested search definition comprises at least one content fragment, and the search loader service module is further executable by the processor to determine whether the modified at least one requested search definition includes at least one deleted content fragment.

13. The apparatus according to claim 12, wherein the search loader service is further executable by the processor to determine whether the modified at least one requested search definition includes at least one additional content fragment to be searched; and the search service module is further configured to apply the modified at least one requested search definition to a next selected digital documents/media of the related digital documents/media.

14. The apparatus according to claim 8, wherein the search queue loader is continually polled by the search loader service to determine whether a previously deactivated at least one requested search definition has been activated, wherein the search service is further executable by the processor to search a next digital documents/media of the related-digital documents/media with the activated previously deactivated at least one requested search definition.

15. The apparatus according to claim 8, further comprising a user interface executable by the processor to format the search results.

16. The apparatus according to claim 8, further comprising a user interface executable by the processor to receive user input to at least one of modify at least one requested search definition and to activate a previously deactivated at least one requested search definition.

17. A computer apparatus, comprising:

a memory that stores instructions; and a processor that executes the instructions, wherein, when executed by the processor, the instructions cause the processor to perform operations comprising:

storing received digital documents/media in an object store, the digital documents/media comprising at least one of processed voice recordings, processed video recordings, processed audio recordings and emails;

retrieving at least one search request identifying the digital documents/media to be searched and the at least one requested search definition to be searched in the related digital documents/media;

placing at least the digital documents/media related to the at least one search request, which are stored in the at least one object store, into a search loader queue and placing digital documents/media newly saved in the object store into the search loader queue;

populating a first search queue for the at least one search request with the related digital documents/media related to a domain of the at least one search request from the search loader queue at a marked time;

chronologically searching with at least one search processor the related-digital documents/media in the first search queue for the at least one search request for the at least one requested search definition, wherein the related digital documents/media in the first search queue are chronologically searched from the related digital documents/media most recently stored in the object store to oldest related digital documents/media stored in the object store;

continually polling the search loader queue for newly received digital documents/media placed in the search loader queue after the marked time;

wherein, when the continual polling finds newly received digital documents/media, further comprising:

determining whether the newly received digital documents/media is within a domain of the at least one search request, and when the newly received related digital documents/media is within the domain of the at least one search request, the at least one search processor will next search the newly received digital documents/media for the at least one requested search definition, and thereafter, resume the chronological searching the digital documents/media in the first search queue for the at least one search request for the at least one requested search definition; and identifying which of the stored related digital documents/media and the newly received related digital documents/media searched contain the at least one requested search definition.

* * * * *